US007978659B2

(12) United States Patent
Li et al.

(10) Patent No.: US 7,978,659 B2
(45) Date of Patent: Jul. 12, 2011

(54) METHOD AND APPARATUS OF CONNECTIVITY RECOVERY IN A WIRELESS NETWORK

(75) Inventors: Guoqing Li, Portland, OR (US); Carlos Cordeiro, Portland, OR (US); Praveen Gopalakrishnan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 103 days.

(21) Appl. No.: 12/208,625

(22) Filed: Sep. 11, 2008

(65) Prior Publication Data

US 2009/0232010 A1 Sep. 17, 2009

Related U.S. Application Data

(60) Provisional application No. 61/035,480, filed on Mar. 11, 2008.

(51) Int. Cl.
*H04W 4/00* (2009.01)
*H04L 12/28* (2006.01)
(52) U.S. Cl. .................. 370/334; 370/431; 370/329
(58) Field of Classification Search .................. 370/334, 370/400, 290, 431, 901, 908, 329; 455/562.1, 455/101, 458, 91
See application file for complete search history.

(56) References Cited

U.S. PATENT DOCUMENTS

| | | |
|---|---|---|
| 2003/0161268 A1 | 8/2003 | Larsson et al. |
| 2006/0068719 A1 | 3/2006 | Hairapetian |
| 2007/0037528 A1 | 2/2007 | Doan et al. |
| 2008/0051149 A1* | 2/2008 | Mehta et al. ............... 455/562.1 |
| 2008/0095104 A1* | 4/2008 | Hansen ........................ 370/329 |
| 2008/0218413 A1 | 9/2008 | Li et al. |

OTHER PUBLICATIONS

U.S. Appl. No. 12/229,667, filed Aug. 26, 2008, C. Cordeiro.
Alexander Maltsev, Eduardo Cases, Roman Maslennikov, Roman Maslennikov, Alexey Khoryaev, "Experimental Investigation of WPAN mmWave Communication System rev2.0", Intel White paper.
Ismail Lakkis et al., "mmWave Beamforming", IEEE 802.15/08/0055-01-003c, Jan. 15, 2008.
International Search Report and Written Opinion of Application No. PCT/US2009/036614 mailed on Jul. 31, 2009.

* cited by examiner

*Primary Examiner* — Kwang B Yao
*Assistant Examiner* — Adam Duda
(74) *Attorney, Agent, or Firm* — Shiloh et al.

(57) ABSTRACT

A wireless communication device and a method of operating an antenna training process to discover first and second communication paths between at least two stations, to rank according to a quality criterion transmitting and receiving modes of an antenna, to report best transmitting mode and best receiving mode for transmitting and receiving signals over said first and second communication paths and to establish a communication link on a selected communication path based on the quality of the transmitting mode and said receiving mode.

30 Claims, 4 Drawing Sheets

METHOD AND APPARATUS OF CONNECTIVITY RECOVERY IN A WIRELESS NETWORK

RELATED APPLICATIONS

This application claims the benefit under 35 U.S.C. §119 (e) to U.S. Provisional Patent Application No. 61/035,480, filed Mar. 11, 2008 which is hereby incorporated by reference in its entirety.

BACKGROUND OF THE INVENTION

A personal wireless area network (WPAN) is a network used for communication among computing devices (for example, telephones and personal digital assistants) close to one person. The devices may or may not belong to the person in question. The reach of a WPAN may be a few meters. WPANs may be used for intrapersonal communication among the personal devices themselves, or for connecting via an uplink to a higher level network and the Internet. Personal area networks may be wired with computer buses such as a universal serial bus (USB) and FireWire.

The IEEE 802.15.3 Task Group 3c (TG3c) was formed in March 2005. TG3c is developing a millimeter-wave (mmWawe) based alternative physical layer (PHY) for the existing 802.15.3 Wireless Personal Area Network (WPAN) Standard 802.15.3-2003.

This mmWave WPAN may operate in a band including 57-64 GHz unlicensed band defined by FCC 47 CFR 15.255. The millimeter-wave WPAN may allow high coexistence, in a close physical spacing, with all other microwave systems in the 802.15 family of WPANs.

In addition, the millimeter-wave WPAN may allow very high data rate over 2 Gbit/s applications such as high speed internet access, streaming content download (e.g., video on demand, high-definition television (HDTV), home theater, etc.), real time streaming and wireless data bus for cable replacement. Optional data rates in excess of 3 Gbit/s may be provided.

However, an mmWave communication link is significantly less robust than those at lower frequencies (e.g. 2.4 GHz and 5 GHz bands) due to both oxygen absorption and high attenuation through obstructions. In addition, a mmWave communication link prefers to use directional antenna to increase the communication range, and the use of directional antenna makes a link very sensitive to mobility. For example, a slight change in the orientation of the device or the movement of a nearby object and/or person may disrupt the link. Therefore, there is a need to design a mechanism to enable fast recovery of the directional communication link with minimum service disruption.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
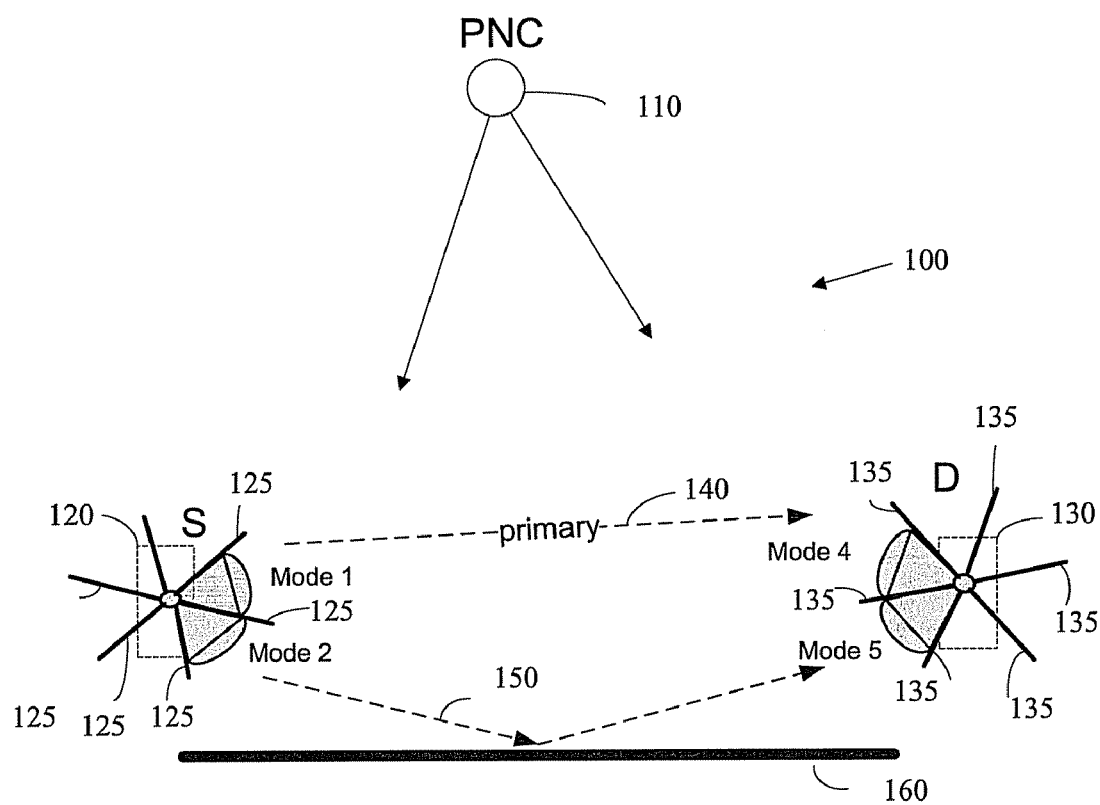
FIG. 1 is a schematic illustration of a wireless communication network according to exemplary embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Some portions of the detailed description, which follow, are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, or transmission devices.

It should be understood that the present invention may be used in a variety of applications. Although the present invention is not limited in this respect, the circuits and techniques disclosed herein may be used in many apparatuses such as stations of a radio system. Stations intended to be included within the scope of the present invention include, by way of example only, wireless local area network (WLAN) stations, wireless personal network (WPAN), and the like.

Types of WPAN stations intended to be within the scope of the present invention include, although are not limited to, mobile stations, access points, stations for receiving and transmitting spread spectrum signals such as, for example, Frequency Hopping Spread Spectrum (FHSS), Direct Sequence Spread Spectrum (DSSS), Complementary Code Keying (CCK), Orthogonal Frequency-Division Multiplexing (OFDM) and the like.

Turning first to FIG. 1. a schematic illustration of a wireless communication network 100, according to exemplary embodiments of the invention. Wireless communication network 100 may be WPAN.

According to one exemplary embodiment of the invention, WPAN 100 may operate according to the standard developing by the IEEE 802.15.3 Task Group 3c (TG3c). TG3c developing a millimeter-wave (mmWawe) based alternative physical layer (PHY) for the existing 802.15.3 Wireless Personal Area Network (WPAN) Standard 802.15.3-2003.

According to some exemplary embodiment of the invention, WPAN 100 may include a piconet coordinator (PNC) 110, a station 120 and a station 130. Although the scope of the present invention is not limited in this respect, PNC 110 may be a netbook computer, a laptop computer or the like. Stations 120 and 130 may include a camera, a mouse, an earphone, a speaker, a display, a mobile personal device or the like.

Although the scope of the present invention is not limited in this respect, WPAN 100 may include a piconet which is one of possible topologies for the IEEE 802.15.3 WPAN. For example and according to one of the embodiments of the invention the piconet may include PNC 110 and several slave devices, for example stations 120 and 130 within the transmission range of PNC 110. Any one of stations 120 and 130 may act as the PNC, if desire.

According to at least one embodiment of the invention, the channel time in the piconet is based on the superframe, which may contain three major parts: the beacon, the Contention Access Period (CAP) and the Channel Time Allocation Period (CTAP). The PNC may provide a basic timing for the piconet by broadcasting beacon packets. Beacons may be used to set the timing allocation and management information for the piconet. Stations 120 and 130 may synchronize themselves with PNC 110 by receiving the beacons. The CAP may be used for asynchronous data or communication commands. For example, a medium access mechanism during the CAP may be Carrier Sense Multiple Access/Collision Avoidance (CSMA/CA). The CTAP includes the Channel Time Allocations (CTAs) and the management CTAs (MCTAs). The CTAs may be used for commands, isochronous streams, and asynchronous data and the medium access is based on TDMA. Collision-free transmissions are guaranteed in CTAs.

A method for discovering and reporting a primary path 140 and a secondary path 150 for two devices e.g., stations 120 and 130, according to an exemplary embodiment of the invention a will now be described.

According to this example it is assumed an existence of at least two paths, primary path 140 and secondary path 150. Primary path 140 may be a direct path between a source station (S) e.g., station 120 and a destination station (D)) e.g., station 130, and secondary path 140 may be an indirect path from S to D which may be reflected for example, from a wall 160 or any other device or item in a close vicinity to the stations.

An antenna training process may be used for discovering and reporting an existence of primary and secondary paths 150 and 160, to stations 120 and 130, if desired. In one embodiment of the invention, in order to report the desired information, the flowing example of antenna training acknowledge message ATT ACK (shown below) may be used. Other message formats and other messages may be used. In this example, "Primary beam index" may be used for reporting the primary path information for TX mode and "Candidate beam index" may be used for reporting the secondary path information for TX mode. In other embodiments of the invention more than two paths may be used and a field "number of paths reported" may be added to ATT ACK Message. The "Element ID" field in this message is an ID to identify the type of this message. The "Length" field indicates the length of the message. The "Primary array vector" field indicates the antenna array weight vector that forms the beam. The "Candidate array vector" field indicates the candidate antenna array weight vector that forms the beam.

| Bits: 8 | 8 | 2 | 6 | 6 | TBD | TBD |
|---|---|---|---|---|---|---|
| Element ID | Length | Status | Primary beam index | Candidate beam index | Primary array vector | Candidate array vector |

Example ATT ACK Message

During an antenna training process station 120 may send training sequences from many possible mode/directions, e.g., lines 125 or lines 135 for station 130, which may be represented by, for example, a sector number and/or an array weight vector. Station 130 may receive these training sequences from each mode/direction and may record an estimated best transmitting mode for station 120 and an estimated best receiving mode for station 130, if desired. This antenna training process may change depending upon the training algorithm employed for example, antenna training implicit mode protocol and antenna training explicit mode protocol. The order of the paths may be based on some criteria such as, for example received signal quality.

In this example, station 130 may record in a table similar to exemplary Table 1, the desired antenna modes for first and second paths in a receive mode and a transmit mode, wherein transmission over primary path 140 from station 120 to station 130, station 120 is uses mode 1 and station 130 uses mode 4 in reception. In transmission over secondary path 150 from station 120 to station 130, station 120 uses mode 5, and station 130 uses mode 2 in reception, although the scope of the invention is not limited to this example.

TABLE 1

Example of path information recorded by station 130

| Path | Rx mode | Tx mode |
|---|---|---|
| 1-path | 4 | 1 |
| 2-path | 2 | 5 |

Station 130 may feed back the path information to station 120. For example, station 130 may feed back the preferred transmission mode of station 120 for primary and secondary paths 140 and 150. In accordance to some embodiments of the invention the paths may include mmWave links and may be asymmetric, thus the training process is performed for the reverse link (from D to S) as well. Similarly, station 120 may discover and report the information on the two paths to station 130 using the ATT ACK frame, although the scope of the present invention is not limited to this example.

Figure 2:
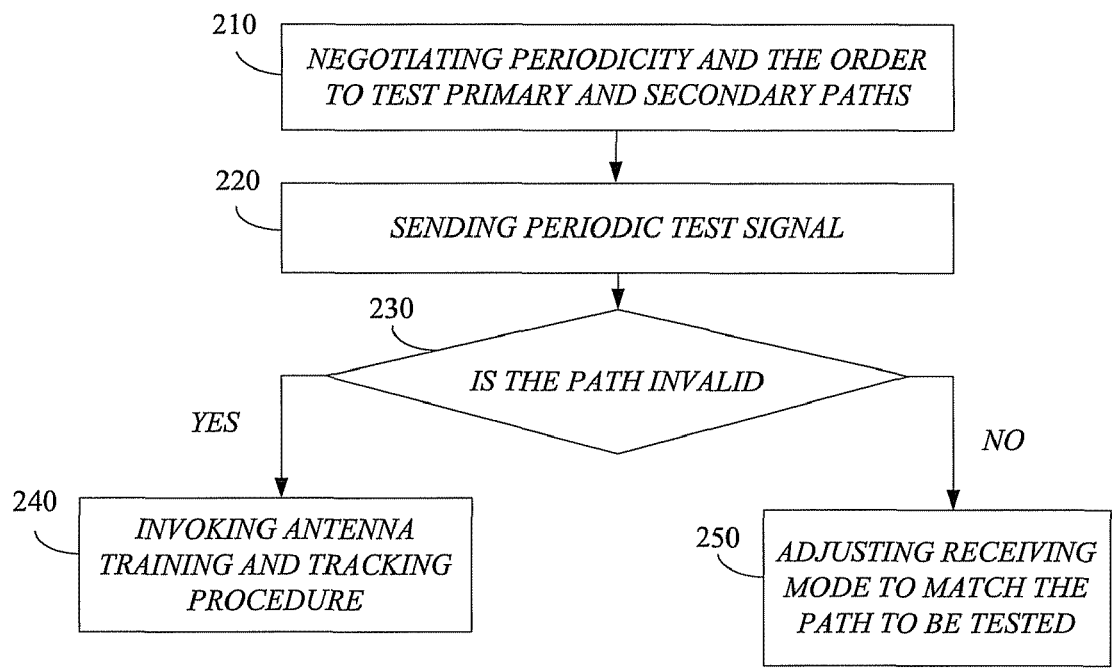
FIG. 2 is a flowchart of a method of periodically monitoring and updating frames, according to some embodiments of the invention.

Turning to FIG. 2 a flow chart of a method of periodically monitoring and updating frames, according to some embodiments of the invention is shown. In order to maintain freshness of the path information, stations 120 and 130 may need to test/track primary path 140 and secondary path 150 periodically and/or on-demand. Stations 120 and 130 may negotiate periodicity by exchanging messages over one of the paths and the order to test primary and secondary paths 140 and 150 (block 210). For example, the periodicity may be 100 us, 1 ms, 10 ms and the order to test may be, first test primary path 140 and then test secondary path 150 and vice versa.

According to this example, a periodic test signal may be sent (block 220) using for example, a "path-Req/Res" message with or without training sequence attached. A test time, for example 100 us may be inserted inside the channel time reserved for stations 120 and 130 in order to send the "path Req/Res" message, if desired. For example, the "path-Req/Res" message may be sent on-demand, then the information about which path is to be tested may be piggybacked or added to a regular packet, if desired. If at least one of primary and/or secondary paths 120 and 130 is tested as invalid (diamond 230) due to certain criteria such as, for example no response message, low signal to noise ratio (SNR) and the like, then the tested path may be considered invalid and then the antenna training and tracking procedure may be invoked in to rediscover the path (block 240), if desired.

If the path is valid then upon receiving the piggyback request, a receiver may adjust its receiving mode to match the path to be tested. The piggyback may use one additional bit to indicate which path to be tested, e.g., primary path 140 or secondary path 150 (block 250). For example, when station 120 requests to test secondary path 130, station 130 may need to adjust its receiving mode to mode 5, as its shown in Table 1.

In another example of embodiment of the invention, a data/ACK packet may be occasionally sent over the tested path instead of the path-Req/Res messages, although the scope of the present invention is not limited to this embodiment.

Figure 3:
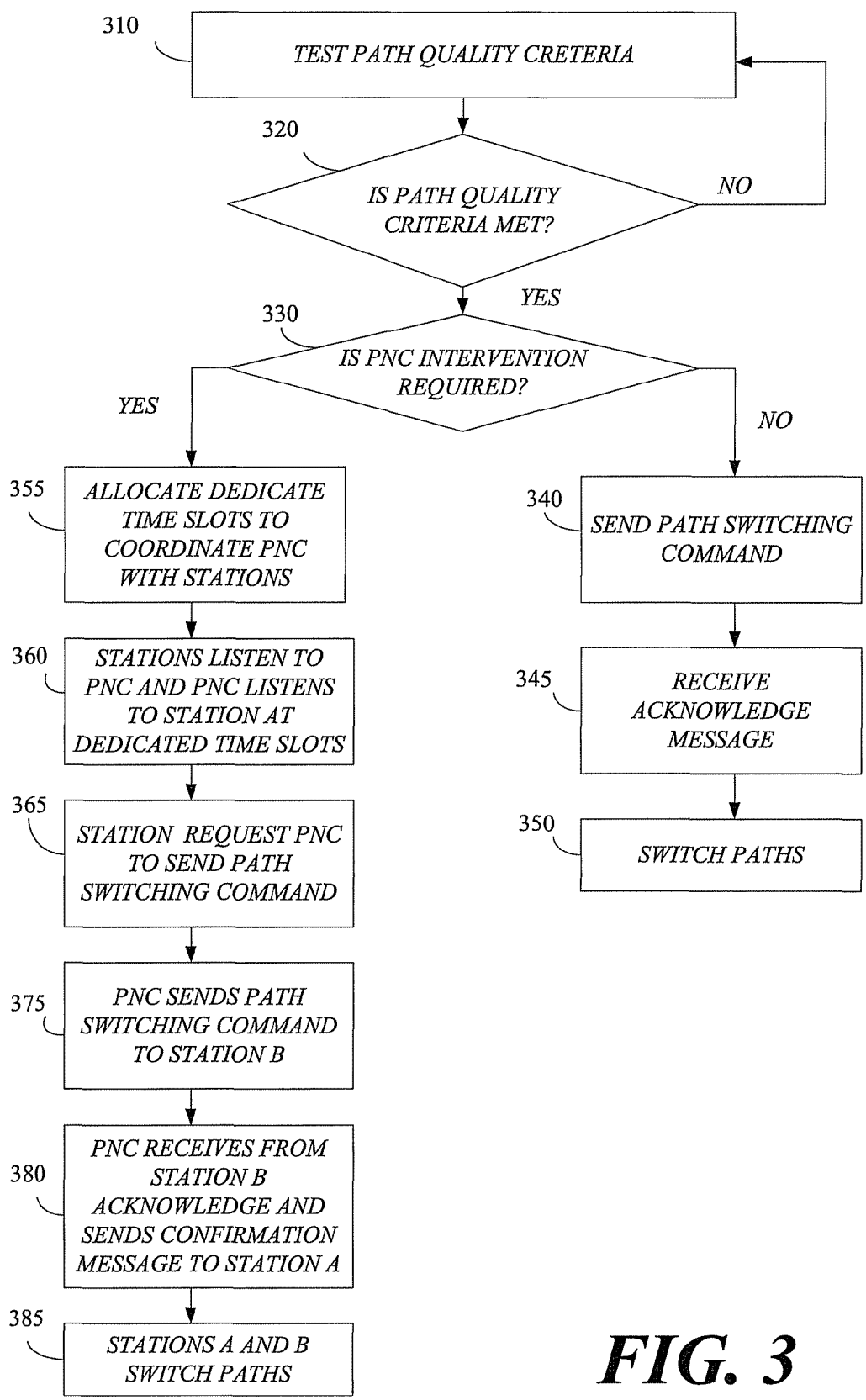
FIG. 3 is a flowchart of a method of switching paths, according to embodiment of the invention.

Turning to FIG. 3 a flowchart of a method of switching paths, according to embodiments of the invention is shown. Although the scope of the invention is not limited to this respect, the piconet communication channels as shown in FIG. 1 may be switched by using the paths switching method that described below. The method may start with testing path quality criteria (block 310). For example, both transmitter (e.g., transmitter of station 120) and receiver (e.g., receiver of station 130) may identify the degradation of currently used path through measured SINR and/or receiving errors and/or other appropriate metrics. In addition, a transmitter may also identify a link problem from an absence of acknowledge (ACK) message.

According to embodiments of the invention, in order for the receiver to identify missing packet, traffic may be set up in a fixed schedule, making transmission/reception predictable for the receiver. As a result, both the transmitter and the receiver may use the number of missed packet/ACK to trigger path switching, if desired. Therefore, once the path quality criteria meet a threshold (applicable for both transmitter and receiver) or the number of missing ACKs is exceeding a threshold (applicable for only transmitter), a station (e.g., station 120 or station 130) may issue a command to the corresponding transmitter/receiver to switch to a different path. Such a command for example, may be an explicit Medium Access Control (MAC) message through for example, one bit indication piggybacked, to a current packet. If the station notices that a certain criteria is met (diamond 320), then path switching may be triggered.

According to embodiments of the invention, there may be at least two procedures for switching paths. The first procedure (blocks 355-385) is with PNC (e.g., PNC 110) intervention (diamond 330) and the second procedure (blocks 340-350) is without PNC intervention (diamond 330).

Although the scope of the present invention is not limited in this respect, in the procedure of switching paths without PNC intervention, the transmitter/receiver for example, station 120, may send a "path-switching command" to the receiver/transmitter (e.g., station 130) indicating an intention to switch path when the quality criteria is met (block 340). Station 130 may send an acknowledge message (block 345) and stations 120 and 130 may switch to a different path (block 350). In embodiments of the invention, for example, before an actual data communication between the stations the transmitter and receiver may still need to validate the path by, for example, exchanging plurality of packets (e.g., null packets).

The procedure of switching paths without PNC intervention (blocks 340-350) may provide a fast link recovery when an existing path is broken. However, since the path switching may not need PNC permission, it may create interference to some existing link(s). To reduce the possible interference, the device may indicate to PNC the intention to use both paths when it initially requests a channel reservation and PNC may avoid scheduling simultaneous links with this link to reduce possible interference.

According to another embodiment of the invention, the transmitter or receiver may not be able to exchange the "path-switching command" before the link is broken, thus making communication infeasible. In this case, path switching needs the facilitation from PNC or may be timeout based.

Although the scope of the present invention is not limited to this example, the procedure of path switching with PNC intervention may be facilitated and granted by the PNC in a coordinated fashion. For example, to allow the PNC to coordinate the switching process, one or more dedicated times for communication between the stations 120 and 130 and PNC 110 may need to be accommodated (block 355). This may be done for example, either over the traditional CAP period and/or over slots reserved inside an actual channel reservation between stations 120 and 130.

In one embodiment, a single time period may be reserved over the traditional CAP period to be used by transmitter (Tx), receiver (Rx) or PNC 110 to send a channel switching request/response. In other embodiment, separate reservations may be allocated for Tx-PNC and Rx-PNC communications, respectively. In the single reservation, a delayed request may be used by either transmitter (Tx) or receiver (Rx) to avoid simultaneous request from both Tx and Rx, if desired. If the delayed request is used by Rx/Tx, then it may need to wait for a predetermined time after the station detects link broken and before the station sends the channel switching request to PNC 110, if desired.

According to this switching procedure, the transmitter (e.g., station 120) and receiver (e.g., station 130) may listen to PNC 110 during the reserved time slots (block 360). PNC 110 may switch to receiving mode during this reserved time in case one of the stations may request PNC 110 to facilitate the switching process.

For example, station 120 may trigger the switching process by sending a "path-switching Req" to PNC 110 during the reserved time slots (block 365). PNC 110 may inform station 130 during the reserved time about the "path-switching Req" (block 375). The path-switching command may include an actual switching time and switching path number for both directions (e.g., from station 120 to station 130 and vice versa). For example, device station 120 may indicate to PNC 110 that it intends to use primary path 140 in the direction from station 120 to station 130 and secondary path 150 in the direction from station 130 to station 120. Station 130 may reply to PNC 110 to acknowledge the switching, and PNC 110 may send a response to station 120 to confirm the switching procedure (block 380). PNC 110 may deny the switching process based on certain criteria such as for example, possible interference to other links and the like. In embodiments of the invention, for example, before an actual data communication between the stations the transmitter and receiver may still need to validate the path by, for example, exchanging plurality of packets (e.g., null packets). If the path is valid station 120 and 130 may switch paths (block 385).

In another embodiment of the inventing, another switching paths procedure with PNC intervention may be employed, for example, wherein the protocol messages between station 120, 130 and PNC 110 may be exchanged over the CAP with little or no modification to the procedure described above. The decision whether to use path switching over the CAP or over the reservation time may be based on a path switching latency, a complexity of the path switching and an efficiency of the path switching, although the scope of the present invention is not limited to this example.

Figure 4:
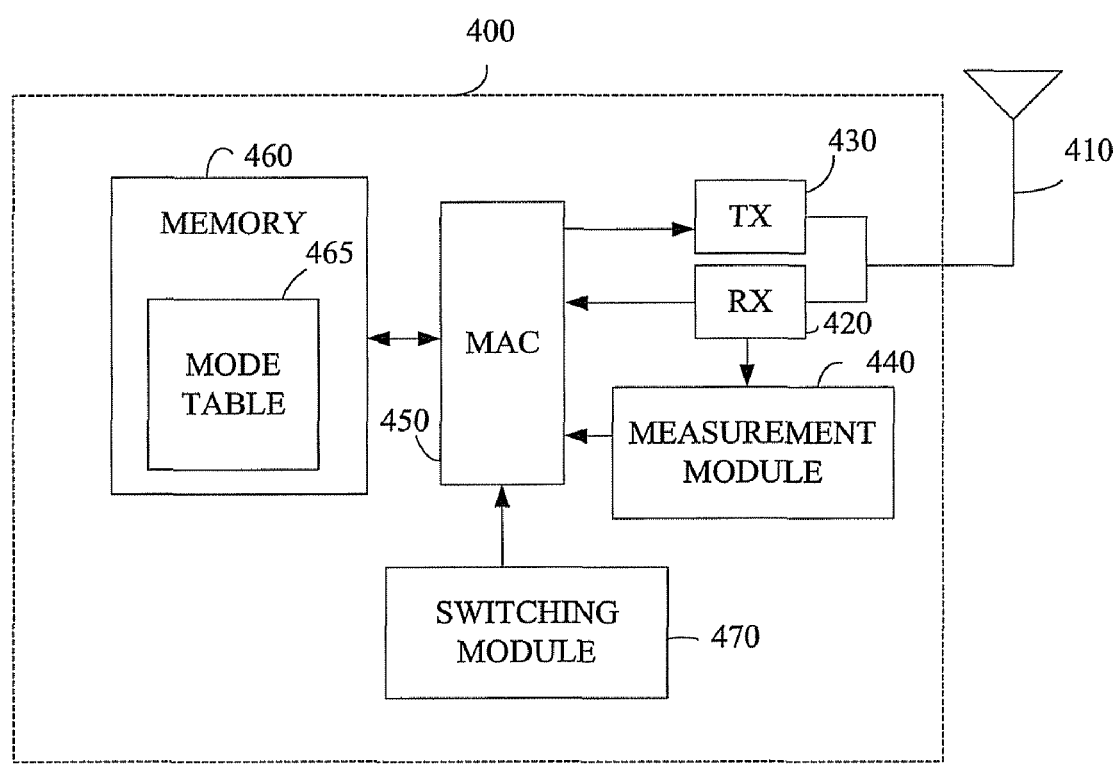
FIG. 4 is a block diagram of a wireless communication device according to some exemplary embodiment of the present invention.

Turning to FIG. 4, a schematic illustration of a block diagram of a wireless communication device 400, according to an exemplary embodiment of the present invention is shown. Although the scope of the present invention is not limited to this embodiment, wireless communication device 400 may able to operate as a WPAN client and/or as a PNC.

According to embodiments of the present invention, wireless communication device 400 may include an antenna 410, a receiver (RX) 420, a transmitter (TX) 430, a measurement module 440, a controller 450, a memory 460 that may store, for example a mode table 465 (and/or other data) and a switching module 470.

Wireless communication device 400 may be any one of stations 120 and 130 of wireless personal network (WPAN) 100 which may employ mmWave communication in a frequency band of 60 GHz and according to IEEE 802.11.15c standard, if desired. WPAN 100 may also include as a piconet, if desired. According to some other embodiments, wireless communication device 40 o may include PNC.

According to some embodiments of the present invention antenna 410 may include a directional antenna, for example, a fixed antenna, an adaptive beamforming antenna, a sectorized antenna and the like. Antenna 410 may be used in creating a mmWave communication link.

Antenna 410 may receive signals from one or more stations (e.g., stations 120 and 130) of WPAN 100. Receiver (RX) 420 may demodulate two or more received training sequence signals and may determine the best transmitting mode and the best receiving mode of a primary path and a secondary path based on the two or more training sequences according to a quality criterion e.g., SNR.

Measurement module 440 may be a software module of controller 450 and may a measure a communication link quality parameter for example SNR, no response message and the like. Measurement 440 module may transfer measurements of the primary path and secondary path to controller 450 to be record in mode table 465 (e.g., Table 1) stored in memory 460.

Although the scope of the present invention is no limited in this respect, the measurements may include primary path information and secondary path information. The first primary information may include the best transmitting mode and the best receiving mode of the primary path and the secondary path information may include the best transmitting mode and the best receiving mode of the secondary path.

According to an exemplary embodiment of the invention, controller 450 may include a medium access controller (MAC), and may generate a report to stations of the WPAN that include the primary path information and the secondary path information. Furthermore, controller 450 may operate an antenna training process to discover the primary path and the secondary path. Controller 450 may rank according to the quality criterion the transmitting and receiving modes/directions of antenna 410. Controller 450 may report the best transmitting mode and the best receiving mode and may establish a communication link on a selected communication path from the primary path and secondary path, based on the quality criterion of said transmitting mode and said receiving mode. The transmitting and receiving modes may also be referred according to embodiments of the invention, as the antenna direction of directional antenna 410 while the antenna is in transmit mode and received mode, respectively.

Furthermore, controller 450 may periodically monitor the primary and secondary communication paths and may update the best transmitting mode and the best receiving mode of both paths, if desired. Controller 450 may also assign a first antenna sector number to the transmitting mode of the primary path, a second antenna sector number to the receiving mode of the primary path, a third antenna sector number to the transmitting mode of the secondary path, and a fourth antenna sector number to the receiving mode of the secondary path.

According to some embodiments of the invention, in order to enable another station of the WPAN to determine its best receiving mode, transmitter (TX) 430 may transmit two or more training sequences to a predetermined direction according to the transmitting and receiving modes of an active path of the primary and secondary paths.

Switching module 470 may test if a communication link quality parameter meets a threshold and/or if the active communication path is broken and/or the active the communication link is disrupted and may command controller 450 to switch to another communication path in order to re-establish the communication link on the other communication path. For example, controller 450 may negotiate a test time for the at least two stations. For example, after coming into agreement on the test time, controller 450 may insert the test time in a channel time interval reserved for communication with the stations and may send a periodic test signal using a message for example, "path-Req/Res" message.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A method of communication in a wireless personal area network (WPAN) comprising:
  operating an antenna training process to discover first and second communication paths between at least two stations wherein the first communication path is a direct communication path between the at least two stations and the second communication path is an indirect path between the at least two stations;
  ranking, according to a quality criterion, transmitting and receiving modes;
  reporting to the at least two stations a best transmitting mode and a best receiving mode for transmitting and receiving signals over said first and second communication paths;
  establishing a mmWave communication link between the at least two stations on a selected communication path which is selected from the first and second communication paths based on the quality of said transmitting mode and said receiving mode; and
  switching the established mmWave communication link from the selected communication path to an unselected communication path when the mmWave communication link of the selected communication path is broken or disrupted.

2. The method of claim 1, comprising:
periodically monitoring the first and second communication paths; and
updating status of the best transmitting mode and the best receiving mode of both said first and second communication paths of the at least two stations.

3. The method of claim 1, comprising:
when the communication link is disrupted,
re-establishing the communication link on the unselected communication path.

4. The method of claim 1, wherein operating comprises:
sending two or more training sequences from two or more transmitting and receiving modes; and
assigning to the two or more transmitting and receiving modes an antenna sector number.

5. The method of claim 1, wherein reporting comprises:
receiving by a first station of the at least two or more stations two or more training sequences;
determining the best transmitting mode and the best receiving mode of the first and second paths based on said two or more training sequences according to said quality criterion; and
recording first path information and second path information at the first station, wherein the first path information includes the best transmitting mode and the best receiving mode of the first communication path and the second path information includes the best transmitting mode and the best receiving mode of the second communication path.

6. The method of claim 5, comprising:
reporting to the second station the first path information and the second path information.

7. The method of claim 2, wherein monitoring comprises:
negotiating a test time;
inserting the test time in a channel time interval reserved for the two or more stations; and
sending a periodic test signal using a message.

8. The method of claim 3, wherein switching comprises:
measuring a communication link quality parameter; and
switching to the unselected communication path if the communication link quality parameter is below a threshold.

9. A wireless communication device comprising:
a controller to operate an antenna training process to discover first and second communication paths to a station of a personal area network wherein the first communication path is a direct communication path to the station and the second communication path is an indirect path to the station, to rank according to a quality criterion transmitting and receiving modes of an antenna, to report a best transmitting mode and a best receiving mode for transmitting and receiving signals over said first and second communication paths, to establish a mmWave communication link on a selected communication path which is selected from the first and second communication paths based on the quality criterion of said transmitting mode and said receiving mode and to switch the established mmWave communication link from the selected communication path to an unselected communication path when the mmWave communication link of the selected communication path is broken or disrupted.

10. The wireless communication device of claim 9, wherein the controller is to periodically monitor the first and second communication paths and to update a status of the best transmitting mode and the best receiving mode of both said first and second communication paths.

11. The wireless communication device of claim 9, wherein the controller is able to, when the communication link is disrupted, reestablish the communication link on the unselected communication path.

12. The wireless communication device of claim 9, comprising:
a memory to store a transmitting and receiving mode related to the primary and secondary paths; and
a transmitter to transmit two or more training sequences to a predetermined direction according to the transmitting and receiving modes of an active path of the primary and secondary paths.

13. The wireless communication device of claim 12 wherein the controller is to assign an antenna sector number to the two or more transmitting and receiving modes.

14. The wireless communication device of claim 9 comprising:
a receiver to receive two or more training sequences; and
wherein said controller is to determine the best transmitting mode and the best receiving mode of the first and second paths based on said two or more training sequences according to said quality criterion and to record in a memory a first path information and a second path information, wherein the first path information includes the best transmitting mode and the best receiving mode of the first communication path and the second path information includes the best transmitting mode and the best receiving mode of the second communication path.

15. The wireless communication device of claim 14, wherein the controller is to report to said station the first path information and the second path information.

16. The wireless communication device of claim 10, wherein the controller to negotiate a test time, to insert the test time in a channel time interval reserved for communication with said station and to send a periodic test signal using a message.

17. The wireless communication device of claim 11, comprising:
a measurement module to measure a communication link quality parameter; and
a switching module to switch to the unselected communication path if the communication link quality parameter meets a threshold.

18. The wireless communication device of claim 9 wherein the controller comprises a medium access controller (MAC).

19. The wireless communication device of claim 9, wherein the device comprises a station of a wireless personal area network (WPAN)

20. The wireless communication device of claim 19 wherein the wireless personal area network includes a piconet and the wireless communication device comprises a piconet coordinator (PNC).

21. A wireless communication device comprising:
a controller to operate an antenna training process to discover first and second communication paths to a station of a personal area network wherein the first communication path is a direct communication path to the station and the second communication path is an indirect path to the station, to rank according to a quality criterion transmitting and receiving modes of an antenna, to report a best transmitting mode and a best receiving mode for transmitting and receiving signals over said first and second communication paths, to establish a mmWave communication link on a selected communication path which is selected from the first and second communication paths based on the quality criterion of said transmitting mode and said receiving mode and to switch the established mmWave communication link from the selected communication path to an unselected communication path when the mmWave communication link of the selected communication path is broken or disrupted; and an adaptive beamforming antenna to transmit over a mmWave communication link.

22. The wireless communication device of claim 21, wherein the controller is to periodically monitor the first and second communication paths and to update a status of the best transmitting mode and the best receiving mode of both said first and second communication paths.

23. The wireless communication device of claim 21, wherein the controller is to, when the communication link is disrupted, re-establish the communication link on the unselected communication path.

24. The wireless communication device of claim 21, comprising:

a memory to store a transmitting and receiving mode related to the primary and secondary paths; and a transmitter to transmit two or more training sequences to a predetermined direction according to the transmitting and receiving modes of an active path of the primary and secondary paths.

25. The wireless communication device of claim 24 wherein the controller is to assign an antenna sector number to the two or more transmitting and receiving modes.

26. A wireless communication system comprising:

a wireless communication device including at least a controller to operate an antenna training process to discover first and second communication paths to a station of a personal area network wherein the first communication path is a direct communication path to the station and the second communication path is an indirect path to the station, to rank according to a quality criterion transmitting and receiving modes of an antenna, to report a best transmitting mode and a best receiving mode for transmitting and receiving signals over said first and second communication paths to establish a mmWave communication link on a selected communication path which is selected from the first and second communication paths based on the quality criterion of said transmitting mode and said receiving mode and to switch the established mmWave communication link from the selected communication path to an unselected communication path when the mmWave communication link of the selected communication path is broken or disrupted.

27. The wireless communication system of claim 26, wherein the controller is to periodically monitor the first and second communication paths and to update a status of the best transmitting mode and the best receiving mode of both said first and second communication paths.

28. The wireless communication system of claim 26, wherein the controller is to, when the communication link is disrupted, re-establish the communication link on the unselected communication path.

29. The wireless communication system of claim 26 comprises a wireless personal area network (WPAN).

30. The wireless communication system of claim 19 includes a piconet and the wireless communication device comprises a piconet coordinator (PNC).

* * * * *